United States Patent
Roemer

(10) Patent No.: US 11,505,384 B2
(45) Date of Patent: Nov. 22, 2022

(54) POURING SPOUT FOR BAG PACKAGING

(71) Applicant: GEORG MENSHEN GMBH & CO. KG, Finnentrop (DE)

(72) Inventor: Frank Roemer, Finnentrop (DE)

(73) Assignee: GEORG MENSHEN GMBH & CO. KG, Finnentrop (DE)

( * ) Notice: Subject to any disclaimer, the term of this patent is extended or adjusted under 35 U.S.C. 154(b) by 381 days.

(21) Appl. No.: 16/753,798

(22) PCT Filed: Oct. 4, 2018

(86) PCT No.: PCT/EP2018/000461
§ 371 (c)(1),
(2) Date: Apr. 6, 2020

(87) PCT Pub. No.: WO2019/072409
PCT Pub. Date: Apr. 18, 2019

(65) Prior Publication Data
US 2020/0255203 A1    Aug. 13, 2020

(30) Foreign Application Priority Data
Oct. 13, 2017    (DE) .................... 10 2017 009 693.7

(51) Int. Cl.
*B65D 75/58*    (2006.01)
*B29C 45/00*    (2006.01)
(Continued)

(52) U.S. Cl.
CPC ...... *B65D 75/5872* (2013.01); *B29C 45/0001* (2013.01); *B29C 45/16* (2013.01);
(Continued)

(58) Field of Classification Search
CPC ........ B65D 25/42; B65D 25/48; B65D 25/40; B65D 43/0214; B65D 75/5872; B65D 75/5861; B29C 45/0001; B29C 45/16
(Continued)

(56) References Cited

U.S. PATENT DOCUMENTS 5,823,383 A * 10/1998 Hins ................. B29C 66/30223
215/44
2004/0051189 A1    3/2004 Meier et al.
(Continued)

FOREIGN PATENT DOCUMENTS

DE         603 09 259 T2    5/2007
JP              4043610 B2 *  2/2008 ......... B65D 41/3447
(Continued)

*Primary Examiner* — Robert J Hicks
(74) *Attorney, Agent, or Firm* — Norman B. Thot

(57) ABSTRACT

An injection molded pourer for a pouch pack. The injection molded pourer includes an inner pouring channel having a pouring spout arranged at an upper end of the inner pouring channel and a boat-shaped weld-in portion which surrounds a lower end of the inner pouring channel, and an injection molding gate arranged on an outside. The pouring spout can be closed with a cap. The boat-shaped weld-in portion has boat-shaped ribs which are arranged parallel to one another and which have a gap there-between. A plastic melt can be pressed into the injection molding gate. The plastic melt includes a main plastic material, and a second plastic material which forms an oxygen barrier.

10 Claims, 1 Drawing Sheet

(51) Int. Cl.
- *B29C 45/16* (2006.01)
- *B29K 23/00* (2006.01)
- *B29K 29/00* (2006.01)
- *B29L 31/00* (2006.01)

(52) U.S. Cl.
CPC .... *B29K 2023/06* (2013.01); *B29K 2023/086* (2013.01); *B29K 2023/12* (2013.01); *B29K 2029/04* (2013.01); *B29K 2995/0067* (2013.01); *B29L 2031/7128* (2013.01); *B65D 2575/583* (2013.01)

(58) Field of Classification Search
USPC ........ 222/569, 567, 566, 570; 215/261, 316, 215/358, 355; 220/804, 801, 796
See application file for complete search history.

(56) References Cited

U.S. PATENT DOCUMENTS

| | | | |
|---|---|---|---|
| 2005/0109796 A1 * | 5/2005 | Bourque | B65D 75/008 222/129 |
| 2006/0213935 A1 | 9/2006 | Johnson et al. | |
| 2016/0068316 A1 | 3/2016 | Wolff et al. | |
| 2017/0225852 A1 | 8/2017 | Ohkubo et al. | |

FOREIGN PATENT DOCUMENTS

| | | | | |
|---|---|---|---|---|
| JP | 2012-162272 A | 8/2012 | | |
| WO | WO-02057157 A1 * | 7/2002 | ........... | B65D 47/243 |
| WO | WO-03031280 A1 * | 4/2003 | ............. | B65D 25/48 |
| WO | WO 2006/081677 A1 | 8/2006 | | |
| WO | WO-2007067029 A1 * | 6/2007 | ............. | B29C 65/18 |
| WO | WO-2007102566 A1 * | 9/2007 | ....... | B29C 45/14598 |
| WO | WO 2014/187520 A1 | 11/2014 | | |

* cited by examiner

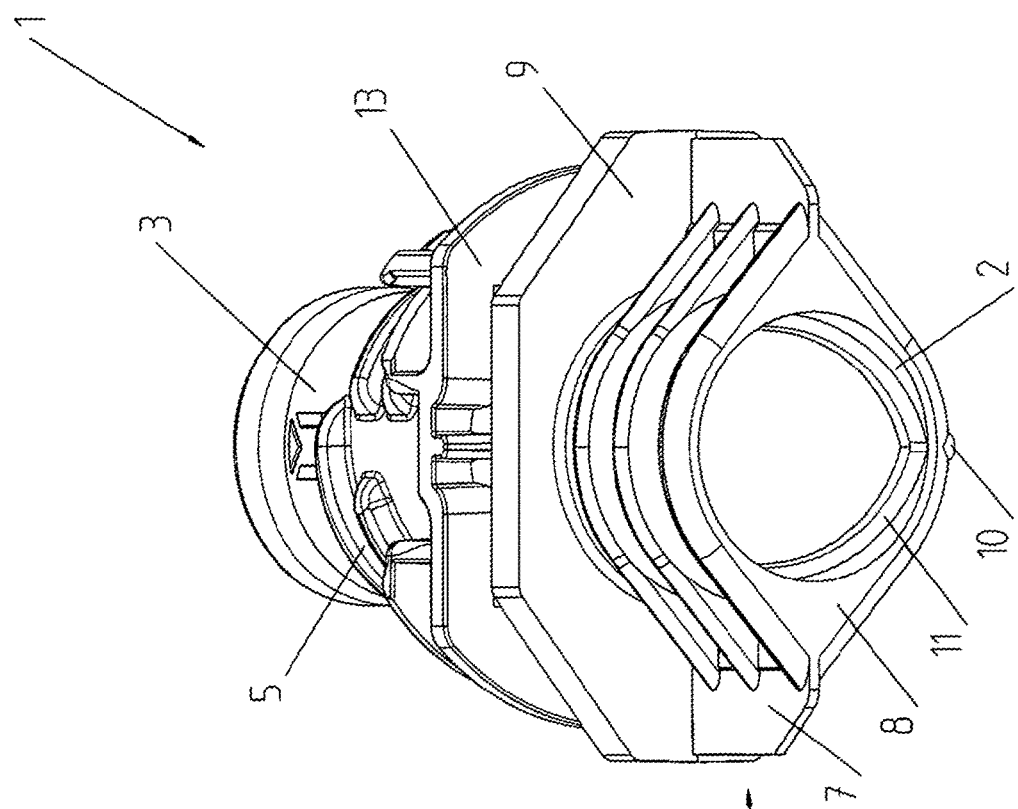
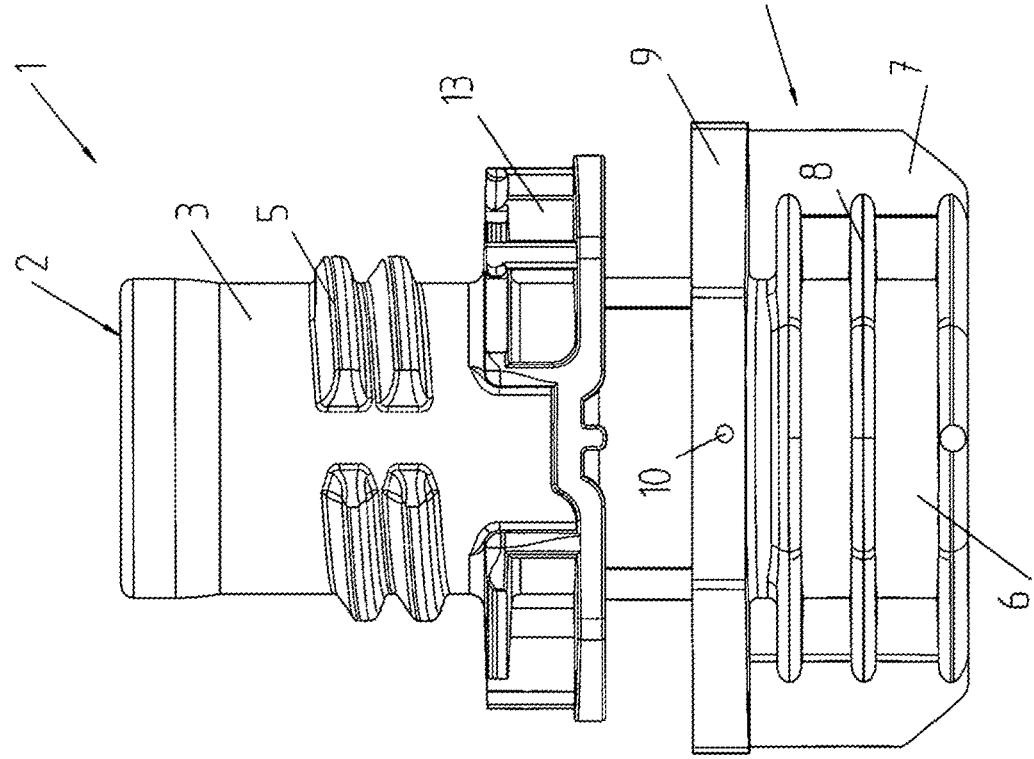

POURING SPOUT FOR BAG PACKAGING

CROSS REFERENCE TO PRIOR APPLICATIONS

This application is a U.S. National Phase application under 35 U.S.C. § 371 of International Application No. PCT/EP2018/000461, filed on Oct. 4, 2018 and which claims benefit to German Patent Application No. 10 2017 009 693.7, filed on Oct. 13, 2017. The International Application was published in German on Apr. 18, 2019 as WO 2019/072409 A1 under PCT Article 21(2).

FIELD

The present invention relates to an injection molded pourer for pouch packs, the pourer having an inner pouring channel which has a pouring spout which can be closed by a cap at its upper end and which, at its lower end, is surrounded by a boat-shaped weld-in portion having boat-shaped ribs which are parallel to one another and have gaps between them and which surround the pouring channel, the pourer having at least one injection molding gate on the outside through which gate the plastic melt is pressed in.

BACKGROUND

In order to provide a long shelf life of products in pouch packs, it is important that the product surrounded by the pouch (in particular, food, fruit juice or fruit juices) does not come into contact with oxygen. Making the film of a material that holds back oxygen is a known method of preventing oxygen from penetrating through the film material of the pouch. Oxygen can, however, still penetrate through the plastic of the pourer into the pouch interior.

SUMMARY

An aspect of the present invention is to improve a pourer of the type mentioned above so that oxygen is largely prevented from penetrating through the plastic material.

In an embodiment, the present invention provides an injection molded pourer for a pouch pack. The injection molded pourer includes an inner pouring channel comprising a pouring spout arranged at an upper end of the inner pouring channel and a boat-shaped weld-in portion arranged to surround a lower end of the inner pouring channel, and at least one injection molding gate arranged on an outside. The pouring spout is configured to be closable via a cap. The boat-shaped weld-in portion comprises boat-shaped ribs which are arranged parallel to one another and to have gaps there-between. The at least one injection molding gate is configured so that a plastic melt can be pressed therein. The plastic melt comprises a main plastic material, and a second plastic material which forms an oxygen barrier.

BRIEF DESCRIPTION OF THE DRAWINGS

The present invention is described in greater detail below on the basis of embodiments and of the drawings in which:

FIG. 1 shows a side view of the pourer; and
FIG. 2 shows in inclined bottom view of the pourer.

DETAILED DESCRIPTION

The present invention provides that together with the main plastic material, a second plastic material is injected which forms an oxygen barrier.

An oxygen barrier layer is thereby formed within the plastic of the pourer which prevents oxygen from penetrating through the pourer. The manufacturing of such a pourer is technically simple and does not lead to a high expense of material and costs.

An optimum distribution of the second material is achieved when a horizontal cover plate is molded between the pouring spout and the weld-in portion, which cover plate is penetrated by the pouring channel and has the injection molding gate at its outer edge.

The entry of the second material is further improved if at least one, in particular thicker, runner leads from the gate to an area of the pourer remote from the injection molding gate. At least one runner may run inside the pouring channel. It is also advantageous if at least one runner runs on the outside of the pourer.

It is alternatively proposed that at least one rib have a thickness which serves as a runner.

The main plastic material can, for example, be a polypropylene or a polyethylene, and the second plastic material forming the oxygen barrier can, for example, be an ethylene-vinyl alcohol copolymer or a polyvinyl alcohol.

The method of producing the pourer is particularly advantageous if the plastic material is first injected through the injection molding gate (10) and spreads into two zones inside the mold cavity on two sides of the injection molding gate or at the end of the runner or runners (11), and immediately thereafter, the second main plastic material is injected through the same injection molding gate (10) and spreads between the two zones of the main plastic material, thus forming the oxygen barrier between the two zones of the main plastic material.

Embodiments of the present invention are shown in the drawings and are described in greater detail below.

The pourer (pouring spout, weld-in portion) 1 is made of plastic by injection molding and has a cylindrical pouring channel 2 running through the entire component, the pouring channel 2 being formed in the upper portion by a cylindrical, tubular pouring spout 3 and in its lower portion by a weld-in portion 4. The top pouring spout 3 has an external thread 5 on its outside, so that a closure cap can be screwed onto the pouring spout.

The weld-in portion 4 has a tubular spout 6, which forms the lower part of the inner pouring channel 2, so that the pouring spout 3 and the tubular spout 6 are arranged vertically and coaxial to each other. A central vertical parting plane 7 protrudes on both sides of the tubular spout 6. Horizontal ribs 8 are molded on the tubular spout 6 on both sides of the parting plane 7. The horizontal ribs 8 level off into the parting plane 7 at their ends so that the two ends of the horizontal ribs 8 located on the same horizontal level are lenticular or boat-shaped when viewed from above. The weld-in portion 4 with its ribs and the parting plane 7 is thereby boat-shaped.

In the transition between the pouring spout 3 and the weld-in portion 4, a horizontal cover plate 9 is molded onto the pouring spout 3 and the tubular spout 6. When seen from above, this horizontal cover plate 9 is polygonal, in particular, octagonal, and protrudes laterally beyond the horizontal ribs 8 and has a greater thickness than the horizontal ribs 8. An injection molding gate 10 is arranged at the outer edge of the horizontal cover plate 9. Injecting plastic melt through this injection molding gate 10 provides that the plastic is injected quickly and far into the mold cavity.

The main plastic material, for example, polypropylene or polyethylene, is first injected through injection molding gate 10. The main plastic material immediately spreads into all zones of the mold cavity and promptly begins to solidify on the outer sides. The amount of main plastic material injected into the cavity is, however, slightly less than the amount of plastic which is required to completely fill the cavity. Immediately after the shot of the main plastic material has been injected, a second plastic material, for example, an ethylene-vinyl alcohol copolymer or a polyvinyl alcohol, is injected through the injection molding gate 10 and spreads into the not yet solidified soft area of the plastic material and there forms an approximately horizontal middle barrier layer across the width of the pourer between the upper and the lower portion/quantity of the main plastic material. The mold cavity has thereby been completely filled with plastic.

After the mold cavity has been completely filled, a small amount of main plastic material is injected into the injection molding gate 10, which closes the injection molding gate 10.

In an embodiment, the injection mold forms at least one thicker runner 11 starting from injection molding gate 10. Two such runners 11 are shown in FIG. 2. In this case, the injection molding gate 10 can be arranged near the lower end of the mold cavity, as the runner(s) 11 conduct(s) the main plastic material and the second plastic material far upwards. At least one runner 11 may run inside the pouring channel 2 and/or at least one runner 11 may run on the outside of the pourer 1 as a distribution channel. At least one horizontal rib 8 may be provided to have a thickness so that it serves as a runner 11.

A primer can, for example, be added to both main plastic materials or at least to one of the two materials to promote adhesion.

The pouring spout 3 in FIGS. 1 and 2 has external projections 13 in the zone between the external thread 5 and the horizontal cover plate 9, the external projections 13 being provided as an engagement or securing element for the closure cap.

The present invention is not limited to embodiments described herein; reference should be had to the appended claims.

What is claimed is:

1. An injection molded pourer for a pouch pack, the injection molded pourer comprising:
   an inner pouring channel comprising,
      a pouring spout arranged at an upper end of the inner pouring channel, the pouring spout being configured to be closable via a cap, and
      a boat-shaped weld-in portion arranged to surround a lower end of the inner pouring channel, the boat-shaped weld-in portion comprising boat-shaped ribs which are arranged parallel to one another and to have gaps therebetween; and
   at least one injection molding gate arranged on an outside, the at least one injection molding gate being configured so that a plastic melt can be pressed therein,
   wherein,
      the plastic melt comprises a main plastic material and a second plastic material which forms an oxygen barrier.

2. The injection molded pourer as recited in claim 1, wherein the main plastic material is a polypropylene or a polyethylene.

3. The injection molded pourer as recited in claim 1, wherein the second plastic material is an ethylene-vinyl alcohol copolymer or a polyvinyl alcohol.

4. The injection molded pourer as recited in claim 1, further comprising:
   a horizontal cover plate molded between the pouring spout and the boat-shaped weld-in portion,
   wherein,
      the horizontal cover plate is penetrated by the inner pouring channel, and
      the horizontal cover plate comprises the at least one injection molding gate at an outer edge thereof.

5. The injection molded pourer as recited in claim 1, further comprising:
   at least one runner which leads from the at least one injection molding gate to an area of the injection molded pourer which is remote from the at least one injection molding gate.

6. The injection molded pourer as recited in claim 5, wherein the at least one runner is a thicker runner.

7. The injection molded pourer as recited in claim 5, wherein the at least one runner is arranged to run on an inside of the inner pouring channel.

8. The injection molded pourer as recited in claim 5, wherein the at least one runner is arranged to run on an outside of the injection molded pourer.

9. The injection molded pourer as recited in claim 5, wherein at least one of the boat-shaped ribs comprises a thickness so as to serve as the at least one runner.

10. A method for producing the injection molded pourer as recited in claim 5 via an injection molding, the method comprising:
   injecting the main plastic material through the at least one injection molding gate so that the main plastic material spreads into two zones inside a mold cavity on two sides of the at least one injection molding gate or at an end of the at least one runner; and, immediately thereafter,
   injecting the second plastic material through the same at least one injection molding gate so that the second plastic material spreads between the two zones of the main plastic material so as to form the oxygen barrier between the two zones of the main plastic material.

* * * * *